Sept. 29, 1964
E. H. GREEN
3,150,803
VALVE MECHANISM WITH METERING CHANNEL
Filed April 19, 1962
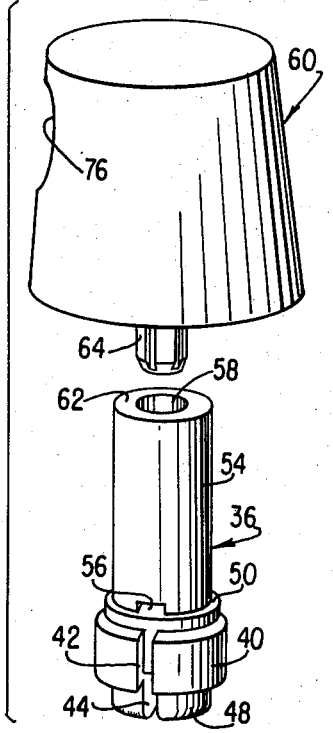
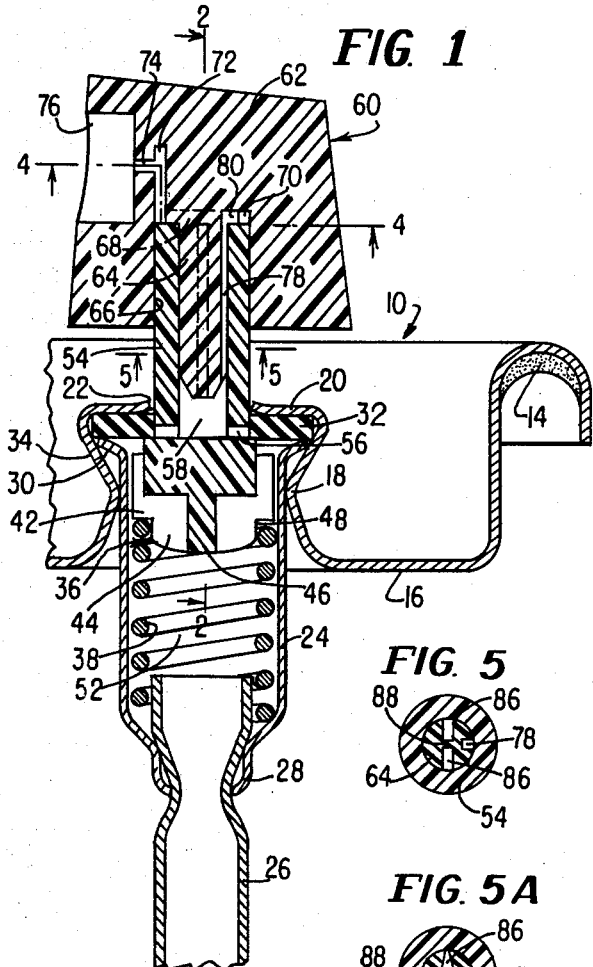
INVENTOR.
EDWARD H. GREEN
BY Silverman, Mullin + Corn
ATTYS.

United States Patent Office 3,150,803
Patented Sept. 29, 1964

3,150,803
VALVE MECHANISM WITH METERING CHANNEL
Edward H. Green, 11 Army Trail Road, Addison, Ill.
Filed Apr. 19, 1962, Ser. No. 188,715
10 Claims. (Cl. 222—394)

This invention relates generally to valve mechanisms for so-called aerosol type containers to enable the efficient and accurate dispensing of the product packaged within the container in aerosol form.

It has been considered that it would be quite advantageous to have the metering of the aerosol controlled externally of the container instead of by some internal metering mechanism. Practically all aerosol packages have depended upon the primary metering to be controlled by a portion of the valve mechanism contained within the assembly that is permanently secured to the aerosol package. While it is true that some metering is accomplished at the orifice in the spray head, nevertheless it is preferred that there be a metering path which gives better and more positive control, especially at lower spray rates.

The invention contemplates a spray head which has a depending stem containing the desired metering channel. The valve includes a tubular portion which projects out through the top of the container and is adapted telescopically to receive therein the stem of the spray head. The spray head contains an expansion chamber and the spray orifice, the expansion chamber including a circular passageway which contributes to an increase in the turbulence of the aerosol, more readily to atomize the same.

The principal achievement of the invention herein is concerned with the solution of a problem which has beset the production and use of a structure of the general type described. If one considers that the depending stem of the srpay head is of very small diameter, say of the order of .080 inch and it is required snugly to fit within the bore of the tubular member extending out of the container top, it will be appreciated that it is extremely difficult accurately to maintain the dimensions of an axially extending metering groove in the surface of the said stem. Compensation for shrinkage during the molding of plastic products cannot be so precisely computed in every case as to eliminate constriction which may be applied to the stem if it is slightly oversize. Such constriction tends to close off the metering groove.

The solvents and carriers of many of the products packaged in aerosol containers adversely affect the plastic. For example, the absorption of the vapors of aromatic chemicals such as ketones, esters and the like break down the chemical lattices of many plastics, causing them to swell and or to become spongy. This is especially true in the case of chlorinated solvents. The end result is that swelling occurs in the stem as well as in the tubular member, the end result of which is a constriction of the stem and a closing off of the metering channel.

The primary object of this invention is to render practical a construction of the general type described, that is one having a tubular member protruding from the container and a depending stem integral with the spray head, by eliminating the effect which might cause constriction of the metering channel in the stem.

According to the invention this is done by providing one or more compensating slots or grooves in the surface of the stem whose purpose it is to preferentially absorb or react to any physical changes in the stem, thereby causing a minimum effect upon the metering channel itself.

Other objects of the invention are concerned with the construction of the valve mechanism to accomplish the above described object.

A preferred embodiment of the invention is illustrated in the accompanying drawing for the purpose of showing the construction of the valve mechanism using the invention, and the said preferred embodiment is described in detail in the accompanying specification, but only by way of example.

In the drawings:

FIG. 1 is a vertical sectional view taken through a valve mechanism and spray head constructed in accordance with the invention.

FIG. 2 is a median sectional view taken generally along the line 2—2 of FIG. 1 in the direction indicated to show the valve mechanism in an open condition.

FIG. 3 is an exploded perspective view showing the spray head and the valve plunger with its vertical tube.

FIG. 4 is a sectional view taken generally along the line 4—4 of FIG. 1 and in the direction indicated.

FIG. 5 is a sectional view taken generally along the line 5—5 of FIG. 1 and in the direction indicated.

FIG. 5A is a view similar to that of FIG. 5 showing the manner in which the compensating slots or grooves may absorb dimensional changes of the stem of the spray head.

FIG. 5B is a view similar to that of FIG. 5 but showing a smaller metering channel.

Generally, the invention is associated with a cover member intended to be secured to the top of a container, the cover member having a central aperture formed in a boss. The boss mounts a washer or gasket of some resilient material having an aperture co-axial with that of the boss, and the washer or gasket being held to the inside of the boss by means of a valve casing having a dip tube connected with the bottom thereof. Within the valve casing there is provided a plunger in the form of a valve having a seat adapted to engage against the bottom of the washer or gasket and being urged to this condition by a spring held within the casing. The aerosol is designed to pass up the dip tube, around the valve and past the seat, when the seat is relieved, out through a tubular member which is integral with the plunger and extends above the boss. The tubular member has a hollow bore, within which a stem which is integral with the spray head is adapted telescopically to be engaged. The stem is tightly engaged within the bore but is removable in order to enable one to replace the spray head with any one of a plurality of other spray heads of different metering characteristics.

The invention primarily is concerned with the construction of the steam of the spray head. The stem has an elongate axially extending metering groove or channel on the exterior thereof which is of predetermined dimensions designed to dispense a particular product at a particular rate. In order to prevent the dimensions of the metering channel to be changed, there are one or more compensating grooves formed in the surface of the stem which are substantially deeper than the metering channel. These compensating grooves are blind, that is, they provide for no passage of aerosol but are so arranged and constructed that, if there is any constriction applied to the stem, the constriction will be absorbed by and change the configuration and dimension of the compensating grooves in preference to altering the configuration and dimensions of the metering channel.

Referring now specifically to the drawings, FIG. 1 is a sectional view taken through a valve structure as it is manufactured ready to be attached to the top of a container. There is provided a cover member 10 of drawn sheet metal having a curled edge 12 adapted to be engaged within the lip of a suitable container and crimped in place. This is a well-known technique, and the cover member 10 is usually provided with a coating of gasket material 14 on the interior of the curled edge 12.

The cover member 10 has an imperforate web 16 designed to resist such pressure as may be applied to the container with which the device is to be used, this container not being shown herein. The web 16 terminates in a central upstanding boss 18 within which the internal portion of the valve mechanism of the invention is adapted to be secured. The top of the boss 18 is shaped to provide an annular formation 20 having a central aperture 22. A cylindrical valve housing or casing 24 which may be of metal or plastic has a dip tube 26, usually of some plastic, frictionally engaged in the bottom thereof as, for example, by the crimp at 28. This dip tube 26 extends to a lower corner of the container.

The upper end of the casing 24 has an annular rim or shoulder at 30 and a washer or annular gasket 32 of rubber or other resilient material is sandwiched between the shoulder 30 and the annular formation 20, the gasket 32 being held in place by a suitable means such as, for example, by the crimp 34 formed in the boss 18 during assembly.

Any suitable technique for assembling the structure may be used. When the housing 24 is assembled to the boss 18 to hold the gasket 32 in place, the valve plunger which is designated generally 36 is located within the housing or casing 24, and a helical spring 38 is seated within the housing and arranged to urge the valve plunger 36 upward.

Perhaps the best view of the valve plunger is that of FIG. 3. At its lower end the valve plunger is provided with a cylindrical guide portion 40, this constituting the greatest diameter of the valve plunger and serving as the means for centering the valve for co-axial movement in a piston-like fashion within the casing 24. The guide portion 40 may fit snugly within the casing 24 because it is divided by means of substantial recesses 42 on opposite sides thereof, these recesses extending along the entire length of the guiding portion 40 and being quite deep at the bottom of the valve plunger 36 as best shown in FIG. 1. It will be seen that the opposite recesses 42 extend almost to a point of meeting one another as shown at 44 in order to be certain that aerosol passing up the center of the spring 38 will be free to find its way into the side channels 42. The center web 46 is for strength and ease in manufacture, being not actually necessary for the efficient operation of the device.

Continuing further with the explanation of the plunger 36, there is a reduced diameter portion 48 at the bottom of the plunger which serves as a projection upon which the spring 38 may seat, as shown in FIGS. 1 and 2.

A reduced diameter annular seat 50 is formed above the guide portion 40, this seat being disposed to engage against the bottom of the gasket 32 to prevent passage of aerosol which may be in the expansion chamber 52 out of the said chamber. The valve plunger 36 includes a cylindrical tubular portion 54 which is integral with the plunger 36, the tubular portion extending tightly through the center opening of the washer or gasket 32 and out of the aperture 26 and being exposed on the exterior of the cover member 10. Obviously, when the cover member 10 is secured to a canister, the tubular portion 54 will be all that can be seen of the valve mechanism. The engagement of the tubular portion 54 with the gasket 32 is a sealing, sliding engagement.

At its lower end, and on a level with the annular seat 50, there is provided a transverse slot or opening 56 which preferably extends completely across the tubular portion 54 and thereby communicates with the hollow bore 58 of the tubular portion 54.

When the tubular portion 54 is pushed downward against the bias of the spring 38, the condition of the parts will be as shown in FIG. 2 and the aerosol product may pass out of the container into the bore 58, and thence into the atmosphere by way of the spray head which is designated generally by the reference character 60.

The upper end of the tubular portion 54 is flat as shown at 62, and it is adapted to seat within the spray head 60 in a manner to be described.

The spray head 60 comprises a generally cylindrical push-button body 62 having a central depending stem 64 integral therewith, the stem being co-axial with a cylindrical cavity 66 whose larger diameter is the same as the external diameter of the tubular portion 54. The diameter of the stem 64, in turn, is approximately the same diameter as the internal diameter of the bore 58, so that the spray head 60 will slide upon and be firmly engaged to the tubular portion 54. By reason of the invention, the stem diameter may even be made minutely greater than the diameter of the bore 58.

At its root the stem 64 includes an annular pedestal 68 against which the upper end 62 of the tubular portion 54 is adapted accurately to seat in face-to-face engagement. The pedestal 68 is surrounded by an annular passageway 70 that communicates through a vertical riser or channel 72 with an orifice 74 formed in the body 62 and opening to the dispensing recess 76. Obviously any form of spray nozzle may be used.

It will be seen that with the stem 64 firmly engaged within the bore 58, the only communication between the orifice 74 and the bore 58 must be by way of a surface channel formed in the stem 64.

Such a channel is shown at 78. The channel 78 extends throughout the entire length of the stem 64 and continues into the pedestal as shown at 80, so that, notwithstanding the tight face-to-face engagement of the end 62 against the pedestal 68, there is free passage past the pedestal and into the annular chamber 70 from the bore 58.

As previously mentioned herein, the invention has solved the difficulty occasioned by constriction of the metering channel 78 by reason of different causes. This has been done by providing one or more compensating grooves to absorb any distortion or change which may occur in the cross-sectional dimension of the stem 64. As shown in FIG. 5, a pair of compensating grooves 86 are provided respectively on opposite sides of the stem 64. These grooves are substantially deeper than the metering channel 78, and hence provide a narrow connecting bridge 88 between them. Any constriction of the stem caused, for example, by swelling of the plastic material from which the spray head and stem are molded or by virtue of the fact that the diameter of the stem 64 may be slightly greater than the bore 58, will be taken up by the grooves 86, in preference to the metering channel 78. Since the radial depth of the compensating grooves 86 is greater than the radial depth of the channel 78, the compensating grooves will prefer to close, leaving the channel 78 substantially unaffected. An exaggerated view of the dimensional changes in diameter and circumference of the stem being taken up by the compensating grooves 86 is shown in FIG. 5A.

While two compensating grooves 86 have been shown, any number may be used, from one to several. Obviously practical considerations of strength and available surface are factors.

It will be noted that at their upper ends, the compensating grooves 86 do not extend into the pedestal 68 so that, when the spray head 60 is seated firmly upon the tubular portion 54, the upper end of portion 54 and pedestal 68 close off the upper ends of the compensating grooves 86 so that none of the aerosol may pass into the annular passageway 70 by way of the compensating grooves 86.

The invention herein makes possible the accurate external metering of aerosol by careful control of the dimensions of the metering channel 78 in the stem 64 of the spray head 60. So long as some means are provided for compensation for changes of dimension due to swelling or inaccuracies in manufacture, the user may be certain that the dimensions of the metering channels 78 will be maintained. In FIG. 5B a smaller metering channel 78' is shown, and three compensating grooves 86' are illustrated for taking up dimensional changes.

Many other variations are capable of being made without departing from the spirit and scope of the invention. The spray head is shown with hollow portions to cut down on the weight and the amount of plastic which are required. The form and configuration of the lower portion of the plunger 36 may be varied. The transverse opening 56 may be formed by a pair of opposite side action pins which could give rise to a small protuberance in the center bottom of the bore 58 which, of course, will not affect passage of aerosol into the bore. The structure may be arranged to be secured to a bottle or other types of containers.

What it is desired to secure by Letters Patent of the United States is:

1. In an aerosol valve assembly having a sealing gasket with an aperture in the gasket, a movable valve member having a tubular extension protruding through the aperture of the gasket, means urging the valve member into sealing engagement with the gasket and the tubular member having a bore closed at the bottom thereof when the valve member is so sealed and the tubular member adapted to be urged through the aperture to unseat the valve member and establish communication between the bore of the tubular member and the opposite side of the gasket; the invention herein comprising a removable and replaceable spray head having a spray orifice and a depending stem adapted to be sealingly and telescopically engaged in the bore, a longitudinally extending metering channel of predetermined cross-sectional dimensions formed on the outer surface of the stem with the upper end thereof in communication with the spray orifice, and the stem having compensating groove means therein displaced from the channel and without fluid connection with the spray orifice whereby changes in dimension of the stem will be preferentially taken up by the said compensating groove means in preference to said metering channel.

2. A structure as claimed in claim 1 in which said compensating groove means have a radial depth greater than the radial depth of said metering channel.

3. A structure as claimed in claim 1 in which said compensating groove means comprise at least one elongate axially extending blind channel on the exterior of said stem having a depth substantially greater than the depth of said metering channel.

4. A spray head adapted telescopically to be inserted into and dispense aerosol coming out of a hollow tube, and arranged to act as a push-button in pressing on said tube axially thereof, said spray head comprising: a body having a nozzle, a depending stem of cross sectional dimension and configuration to be received in the interior of said tube, a cavity in said body of cross sectional dimension and configuration to receive the exterior of said tube in sealing engagement, a metering channel of predetermined cross-sectional dimensions on the exterior of said stem adapted to be defined by the tube, a communicating passageway in said head between said channel and nozzle, and at least one axially extending compensating groove in the stem of said spray head spaced from said channel and without communication with said nozzle for taking up dimension change in said stem in preference to said channel.

5. A spray head as claimed in claim 4 in which said compensating groove is blind in said head.

6. In an aerosol valve structure of the type in which a spring-pressed valve is adapted to be seated against a gasket washer, in which the valve is disposed in a casing on one side of the gasket washer and has a hollow tube extending through the gasket washer to be exposed on the other side of the washer, in which there is a passageway connected with the bore of the tube normally closed off by the washer when the valve is so seated, but is adapted to communicate with the casing when the tube is depressed to move the passageway to be open on said one side of the washer so that aerosol may pass from the casing to the said bore, the combination with said tube of a spray head having an externally opening orifice, a depending integral stem, a metering channel along the axial length of said stem, the bore being dimensioned telescopically and sealingly to receive said stem, a seat in the head at the root of the stem and the channel extending into said seat, a passageway in said head from said orifice to said seat and connected with said extension of said channel whereby aerosol may pass from said channel to said orifice, at least one compensating groove in the stem to take up dimension change extending along the length thereof and terminating at said seat, and means at the end of the tube cooperating with said seat when the stem is disposed in the tube, to close off the terminating end of said compensating groove without closing off said metering channel.

7. The combination of claim 6 in which there are a plurality of compensating grooves and the end of the tube closes off the terminating ends of all of them.

8. The combination of claim 6 in which the seat is a pedestal of diameter greater than said stem, and the passageway includes an annular portion surrounding said pedestal, said channel extension passing through said pedestal and opening to said annular portion, and in which said means at the end of the tube comprises a formation engaging against said pedestal and covering completely said annular portion.

9. In an aerosol valve structure which includes an apertured sealing gasket and a movable valve member having a hollow tubular extension protruding through the gasket aperture and biased normally into sealing engagement with one side of the said gasket to close the bottom of the extension albeit movable in a direction away from the gasket to establish communication between the hollow extension and the opposite side of the gasket, an actuator spray head connected with said extension and having an external orifice for discharging aerosol product to ambient atmosphere, from the hollow extension, said spray head having a solid depending stem removably engaged in the hollow of said protruding extension with the circumferential surface of said stem and the inner circumferential surface of the hollow extension sealingly engaged along their respective lengths, said stem having a channel along the length of the stem opening to said surface thereof with the opening closed by said inner surface of the extension to define a metering channel along the stem, said channel having the upper end thereof in communication with the orifice and being of cross-sectional area selected to provide a predetermined spray rate for aerosol product discharged from said orifice from said channel, said stem having compensating groove means extending along the said surface of the stem circumferentially spaced from said channel and being without connection to said orifice whereby positively and preferentially to take up any dimensional changes in said channel with successive operation of the valve so as to maintain the cross-sectional area of said channel substantially constant.

10. In an aerosol valve assembly having a sealing gasket with an aperture in the gasket, a movable valve member having a tubular extension protruding through the aperture of the gasket, means urging the valve member into sealing engagement with the gasket and the tubular member having a bore closed at the bottom thereof when the valve member is so sealed and the tubular member adapted to be urged through the aperture to unseat the valve member and establish communication between the bore of the tubular member and the opposite side of the gasket; the invention herein comprising a removable and replaceable spray head having a spray orifice and a depending stem adapted to be sealingly and telescopically engaged in the bore, a longitudinally extending metering channel formed on the outer surface of the stem with the upper end thereof in communication with the spray orifice, and being of cross-sectional area selected to provide a predetermined spray rate for aerosol product discharged from said orifice, said stem having compensating groove means formed along the length thereof circumferentially spaced from said channel, said groove means being without connection to said orifice whereby preferentially to take up dimensional changes in the stem in preference to said channel so as to maintain the cross-sectional area of the channel substantially constant.

References Cited in the file of this patent

UNITED STATES PATENTS

| | | |
|---|---|---|
| 2,900,114 | Utz | Aug. 18, 1959 |
| 2,933,222 | Waldherr | Apr. 19, 1960 |
| 3,061,203 | Kitabayashi | Oct. 30, 1962 |
| 3,088,682 | Venus | May 7, 1963 |
| 3,095,127 | Green | June 25, 1963 |